(12) United States Patent
Delaruelle et al.

(10) Patent No.: US 10,406,990 B2
(45) Date of Patent: Sep. 10, 2019

(54) A-PILLAR MOUNTABLE DEVICE HOLDERS

(71) Applicant: Ford Global Technologies LLC, Dearborn, MI (US)

(72) Inventors: Aurelien Pierre Christian Delaruelle, Glenroy (AU); Thi Anh Thu Vu, Melbourne (AU)

(73) Assignee: Ford Global Technologies LLC, Dearborn, MI (US)

( * ) Notice: Subject to any disclaimer, the term of this patent is extended or adjusted under 35 U.S.C. 154(b) by 63 days.

(21) Appl. No.: 15/926,943

(22) Filed: Mar. 20, 2018

(65) Prior Publication Data

US 2018/0304821 A1  Oct. 25, 2018

(30) Foreign Application Priority Data

Apr. 19, 2017  (CN) .......................... 2017 1 0258581

(51) Int. Cl.
*B60R 11/02* (2006.01)
*B62D 25/04* (2006.01)
*B60R 7/04* (2006.01)
*B60R 11/00* (2006.01)

(52) U.S. Cl.
CPC .............. *B60R 11/02* (2013.01); *B62D 25/04* (2013.01); *B60R 7/04* (2013.01); *B60R 2011/0022* (2013.01); *B60R 2011/0071* (2013.01)

(58) Field of Classification Search
CPC ............... B60R 7/04; B60R 11/020241; B60R 11/0258; B60R 13/02; B60R 2011/0022; B60R 2013/0287; B62D 25/04; B60K 35/00

USPC ......... 296/37.8, 1.07, 1.08, 193.06; 224/482, 224/539, 540, 543, 556, 557
See application file for complete search history.

(56) References Cited

U.S. PATENT DOCUMENTS

| 5,024,411 | A | * | 6/1991 | Elwell | ................... | B60N 3/102 |
| | | | | | | 224/281 |
| 5,492,260 | A | * | 2/1996 | Rieden | ..................... | B60R 7/10 |
| | | | | | | 224/313 |
| 7,469,951 | B2 | * | 12/2008 | Welschholz | .............. | B60R 7/06 |
| | | | | | | 296/37.12 |
| 7,648,114 | B2 | * | 1/2010 | Åkerstedt | .............. | B60N 3/102 |
| | | | | | | 248/313 |

(Continued)

FOREIGN PATENT DOCUMENTS

| DE | 19959744 A1 | 6/2001 |
| EP | 2653334 A1 | 10/2013 |

(Continued)

OTHER PUBLICATIONS http://indianautosblog.com/2015/07/ford-figo-aspire-diesel-review-183789.

(Continued)

*Primary Examiner* — Gregory A Blankenship
(74) *Attorney, Agent, or Firm* — Vichit Chea; Kolitch Romano LLP

(57) ABSTRACT

Device holders for vehicles comprises a housing, a claw comprised of a first claw half and second claw half, and a latch for releasably securing the claw within the housing. The holders are secured to a vehicle's A-pillar so as to be just outside of a driver or operator's line of sight, and when secured within the housing are configured so that a visible surface of the claw substantially matches the surrounding trim of the A-pillar in appearance, such as texture and color.

20 Claims, 4 Drawing Sheets

(56) References Cited

U.S. PATENT DOCUMENTS

| | | | | |
|---|---|---|---|---|
| 8,172,299 | B2* | 5/2012 | Lota | B60R 11/00 |
| | | | | 296/24.34 |
| 8,646,824 | B2* | 2/2014 | Da Costa Pito | B60R 11/02 |
| | | | | 296/37.12 |
| 8,763,976 | B1* | 7/2014 | Jachim | B41J 29/04 |
| | | | | 108/43 |
| 9,079,540 | B2 | 7/2015 | Harding et al. | |
| 10,035,466 | B2* | 7/2018 | Ronquillo Melendez | |
| | | | | B60R 7/08 |
| 10,272,847 | B1* | 4/2019 | Fan | B60R 11/0241 |
| 2002/0190176 | A1* | 12/2002 | Louh | B60R 11/0241 |
| | | | | 248/316.4 |
| 2003/0029976 | A1* | 2/2003 | Saitoh | B60R 11/0241 |
| | | | | 248/226.11 |
| 2007/0013200 | A1* | 1/2007 | Totani | B60R 11/02 |
| | | | | 296/1.07 |
| 2008/0169667 | A1* | 7/2008 | Siniarski | B60N 3/002 |
| | | | | 296/37.8 |
| 2016/0214540 | A1* | 7/2016 | Parlow | B60R 7/04 |
| 2016/0288713 | A1* | 10/2016 | Hoyda | H04N 7/181 |
| 2017/0000011 | A1* | 1/2017 | Wagner | B60R 11/0264 |
| 2017/0334363 | A1* | 11/2017 | Bekaert | B60R 11/0235 |
| 2018/0149302 | A1* | 5/2018 | Papapanos | F16M 11/041 |
| 2018/0222400 | A1* | 8/2018 | Neumann | B64D 11/00152 |
| 2018/0304821 | A1* | 10/2018 | Delaruelle | B60R 11/02 |
| 2019/0061622 | A1* | 2/2019 | Hoyda | B60R 1/00 |
| 2019/0135193 | A1* | 5/2019 | Aguirre Hernandez | |
| | | | | B60R 11/02 |
| 2019/0202365 | A1* | 7/2019 | Medina Huerta | B60R 11/02 |

FOREIGN PATENT DOCUMENTS

| | | |
|---|---|---|
| FR | 2987584 A1 | 9/2013 |
| WO | 2004007245 A1 | 1/2004 |

OTHER PUBLICATIONS

Ford Figo Aspire Titanium Diesel—First Drive Review—Jul. 18, 2015 http://indianautosblog.com/2015/07/ford-figo-aspire-diesel-review-183789.

* cited by examiner

A-PILLAR MOUNTABLE DEVICE HOLDERS

RELATED APPLICATION

This application claims the benefit of Chinese Patent Application No.: CN 201710258581.2 filed on Apr. 19, 2017, the entire contents thereof being incorporated herein by reference.

FIELD

The present disclosure relates generally to mechanisms for retaining mobile and portable devices securely within a vehicle cabin, in particular, holders integrated within and configured to retain mobile and portable devices to a vehicle support pillar, preferably in a non-obstructive view for the vehicle operator, and presenting a low impact on the visible surface of the vehicle support pillar when stowed.

BACKGROUND

Drivers of vehicles increasingly rely upon mobile and portable electronic devices, such as smartphones or portable GPS navigators, for various tasks while driving. For example, smartphones are frequently used to provide navigational services by way of any number of different GPS-based applications, such as Google® Maps, that offer turn by turn navigational directions. Additionally, smartphones are frequently used for entertainment purposes, allowing a driver to carry their own personal music library with them. While many modern vehicles are equipped with built-in navigation equipment, using smartphones and similar such mobile devices can be preferable, especially when a driver switches between vehicles or in the case of a rental vehicle, as the driver need not become familiar with multiple interfaces.

Often it is preferable that a mobile device be mounted in a position that is easily visible to the driver. Existing ways of mounting mobile devices are not entirely satisfactory. Built-in navigation systems are typically located in the center of a dash panel, in the case of most cars and trucks. Various holders are available for mobile devices that allow a smartphone or other mobile device to be mounted either to the dash panel proximate to its center, or to the windshield just over the dash panel. Neither position is ideal; a location proximate to the dash panel center or above the dash panel typically requires the driver to take their eyes too far from the road to ensure safe driving, which can be particularly problematic when the mobile device is being used for media playback or entering directions, each of which requires more interaction with the device than simply looking at navigational directions.

An ideal position for mounting a mobile device holder in a car is on the A-pillar of a vehicle, which rises from the side of the vehicle body proximate to the dash panel to join the vehicle roof. The A-pillar is thus positioned proximate to the driver's line of vision, and placing a holder upon the A-pillar positions an inserted mobile device in an ideal location just outside of the driver's direct line of sight. While aftermarket holders may be configured to be attached to a vehicle's A-pillar, it is preferable that the holder be integrated into the A-pillar to provide a more seamless appearance that does not clutter the interior finish of the vehicle.

Thus, there exists a need for device holders that improve upon and advance the design of known mobile device holders and built-in navigation systems. Examples of new and useful device holders relevant to the needs existing in the field are discussed below.

Disclosure addressing one or more of the identified existing needs is provided in the detailed description below. Examples of references relevant to mobile device holders include U.S. Pat. No. 9,079,540 (the '540 patent) to assignee Ford Global Technologies LLC. The '540 patent discloses a mobile device holder that mounts on the center console. When the disclosed holder is not used, it can be placed into a stored configuration that resembles a small dome atop the center of the vehicle's dash. When opened, the top of the disclosed holder hinges upward, similar to a claw or clamshell, to accommodate a mobile device. The complete disclosures of the above patents and patent applications are herein incorporated by reference for all purposes.

SUMMARY

According to a first aspect of the present disclosure, a holder for a portable electronic device comprises a housing configured to be attached to an A-pillar of a vehicle, and a claw hingedly attached to the housing comprised of a first claw half, a second claw half hingedly attached to the first claw half, and a spring to bias the second claw half towards the first claw half. At least the second claw half is extended from a surface of the A-pillar to hold the electronic device when the electronic device is in use, and the claw is selectably retained within the housing when the holder is not in use.

In one embodiment, the holder further comprises a push-push latch to enable a release, with the claw selectably retained within the housing by the push-push latch, so that an application of force by a user releases the claw to be away from the surface of the A-pillar and the user is able to pull at least the second claw half from the housing and place the electronic device between the first claw half and the second claw half.

In another embodiment, the holder further comprises a second spring to bias the claw away from the housing when the housing is disengaged from the push-push latch.

In another embodiment, each of the first claw half and second claw half further comprise a support mat.

In yet another embodiment, the second claw half includes a cover configured to substantially match an A-pillar trim in color and material.

In another embodiment, the housing is configured to fit into a cavity in the A-pillar so that the cover of the second claw half is approximately flush with the A-pillar trim.

In another embodiment, the first claw half is configured to be rotatable with respect to the second claw half.

In still another embodiment, the housing substantially encloses the claw.

According to a second aspect of the disclosed invention, a pillar mounted holder for a portable electronic device comprises a housing secured to the pillar and a claw hingedly attached to and substantially enclosed by the housing. The claw is comprised of a first claw half, a second claw half hingedly attached to the first claw half, and a spring configured to bias the second claw half towards the first claw half. A latch mechanism is configured to selectably retain the claw within the housing. The holder is mounted to the pillar.

In one embodiment, the pillar is an A-pillar of a vehicle.

In another embodiment, the holder is configured to be secured to a sheet metal piece of the A-pillar, and an outer surface of the second claw half is substantially flush with a surrounding surface of the A-pillar when the holder is not in use.

In yet another embodiment, the latch mechanism further comprises a push-push latch and a second spring configured to bias the holder away from the pillar.

In still another embodiment, the first claw half and second flaw half each further include a support mat configured to securely hold the portable electronic device without damage.

According to a third aspect of the disclosed invention, a vehicle configured to receive a portable device comprises an A-pillar, and a holder including a housing, a first claw half hingeably secured to the housing, a first spring configured to bias the first claw half away from the housing, a second claw half hingeably secured to the first claw half, a second spring configured to bias the second claw half towards the first claw half, and a latch mechanism configured to selectively retain the first claw half and second claw half substantially within the housing. The housing of the holder is attached to a sheet metal piece of the A-pillar, and the second claw half is held within the housing and a cover of the second claw half is disposed substantially flush with a surface of an A-pillar trim facing the vehicle interior when the latch mechanism retains the first claw half and second claw half within the housing.

In one embodiment, at least the second claw half is positioned outside of the housing by the first spring when the latch mechanism releases the first claw half.

In another embodiment, the latch mechanism comprises a push-push latch that is configured to release at least the second claw half when a force is applied to the surface of the second claw half.

In another embodiment, the first claw half and second claw half cooperate to retain the portable device.

In another embodiment, the first claw half and second claw half each further comprise a support mat configured to retain the portable device without causing damage to the portable device.

In yet another embodiment, the cover of the second claw half is configured to match an appearance of the A-pillar trim.

In still another embodiment, the cover of the second claw half is made from the same material as the A-pillar trim.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
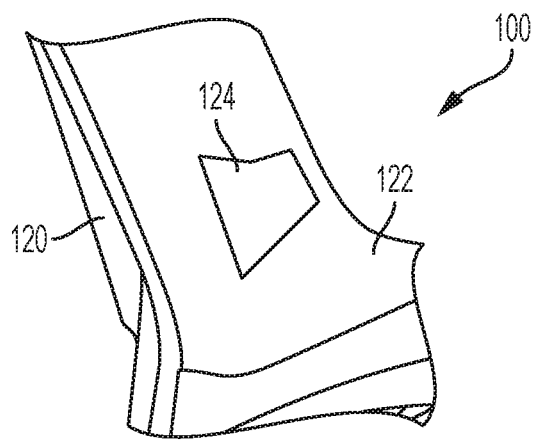
FIG. 1 is a perspective view of a first example of a vehicle-mounted holder for a mobile device, with the holder in a closed configuration.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed device holders will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various device holders are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-4, a first example of a vehicle-mounted holder for a portable/mobile device, holder 100, will now be described. Holder 100 functions to provide an A-pillar mounted holder that can be permanently installed and helps maintain a clean visual appearance to a vehicle interior. The reader will appreciate from the figures and description below that holder 100 addresses shortcomings of conventional mobile device holders.

For example, holder 100 allows a vehicle driver to mount their smartphone or other mobile device in a location proximate to their normal sightline while driving, as opposed to a position that is around or above the center of the vehicle console. Holder 100 is preferably mounted to a vehicle A-pillar that is proximate to the driver's position. In this position, a mobile device mounted to holder 100 will be close to the driver's sightline. The driver can quickly refer to the mobile device with only a quick side glance, otherwise allowing the driver to keep his or her eyes on the road. Further, holder 100 is preferably mounted so that the portion of holder 100 that is most proximate to the vehicle interior is flush with the interior surface of the A-pillar when holder 100 is not in use. The interior facing portion of holder 100 configured to match the interior surface of the A-pillar so as to provide a seamless and clean visual appearance. Holder 100 is preferably held in a storage position by a push-push latch so that, apart from a seam where the interior surface of the A-pillar ends and the interior surface of holder 100 begins, holder 100 is otherwise invisible.

Figure 6A:
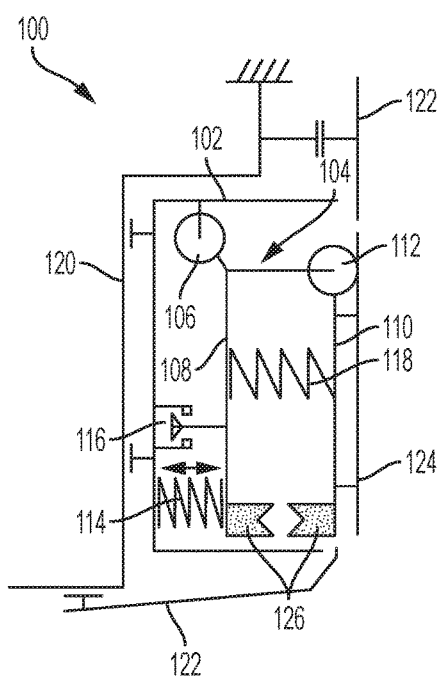
FIG. 6A is a schematic view of the holder shown in FIG. 1 depicting the arrangement of the holder components as mounted to the vehicle, with the holder in the closed and latched configuration shown in FIG. 1.
Figure 6B:
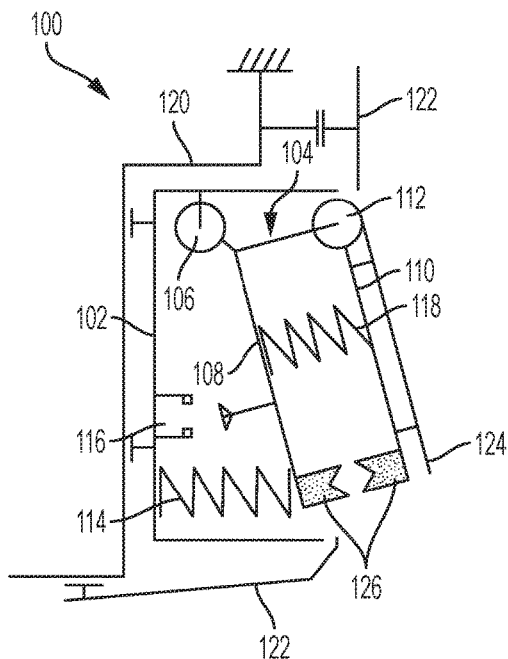
FIG. 6B is a schematic view of the holder shown in FIG. 1 depicting the arrangement of the holder components as mounted to the vehicle, with the holder in the initial open configuration shown in FIG. 2.
Figure 6C:
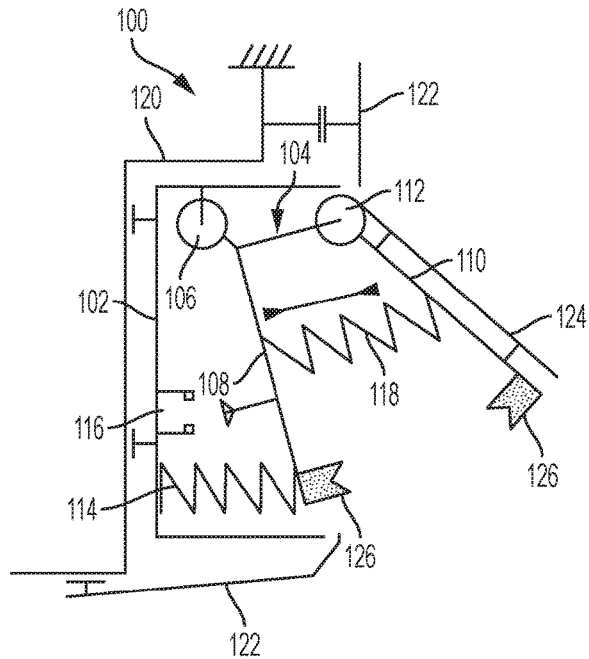
FIG. 6C is a schematic view of the holder shown in FIG. 1 depicting the arrangement of the holder components as mounted to the vehicle, with the holder in the open configuration shown in FIG. 3.

Referring to FIGS. 6A-6C, Holder 100 for a portable mobile device 130 includes a housing 102 configured to be attached to an A-pillar 120 of a vehicle. A claw 104 is attached to housing 102 via a hinge 106, and is comprised of a first claw half 108, a second claw half 110 attached to first claw half 108 via a second hinge 112, and a spring 118 configured to bias second claw half 110 towards first claw half 108. Second claw half 110 extends from the surface of A-pillar 120 to hold mobile device 130 when in use, and claw 104 is selectably retained within housing 102 when holder 100 is not in use by a latch 116.

Mobile device 130 can be an electronic device such as a smartphone, MP3 player, media player, GPS navigator or other similar type of device, or could be any other electronic or non-electronic apparatus of a suitable size to be held within claw 104. Other possible devices could include non-electronic implements such as a notepad or accessory holder, for example, a holder for personal accessories such as sunglasses.

Figure 2:
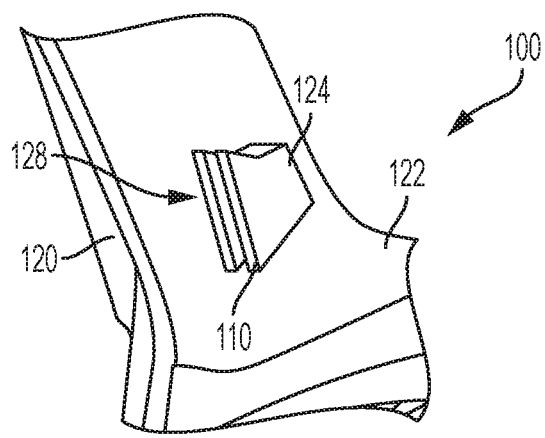
FIG. 2 is a perspective view of the holder shown in FIG. 1 depicting the holder in an initial open configuration.
Figure 3:
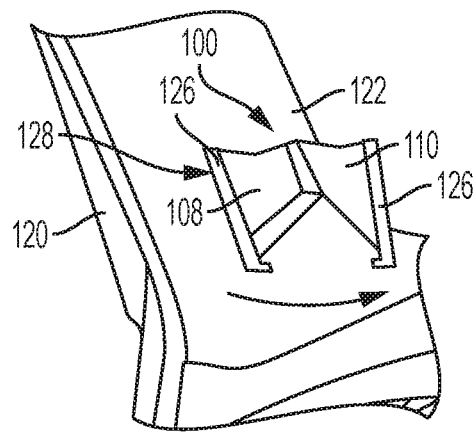
FIG. 3 is a perspective view of the holder shown in FIG. 1 depicting the holder with the claw in an open configuration ready to receive a mobile device.
Figure 4:
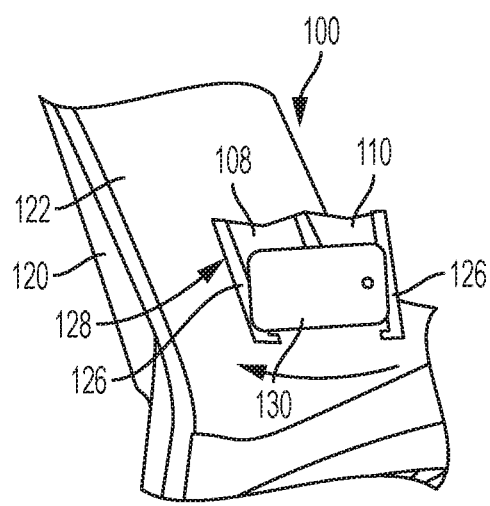
FIG. 4 is a perspective view of the holder shown in FIG. 1 depicting the holder with the mobile device inserted and held in position for a driver of the vehicle.

FIGS. 1-4 depict holder 100 in various stages of operation. FIG. 1 depicts holder 100 in a closed and stored position. Trim 122 forms the interior surface of A-pillar 120, and a corresponding cover 124 of holder 100 lays flush with trim 122. A user can push against surface 124 in the direction of A-pillar 120, and a push-push mechanism causes holder 100 to unlatch and place it into the position shown in FIG. 2. In FIG. 2, second claw half 110 at least protrudes into the interior of the vehicle away from trim 122. A cavity 128, inside of which holder 100 is disposed, is made visible. The user can grasp second claw half 110 and pull it away from A-pillar 120, placing holder 100 into the configuration depicted in FIG. 3, where first claw half 108 is now visible, along with support mats 126. First claw half 108 may also protrude away from trim 122. The user can then place mobile device 130 into holder 100 as depicted in FIG. 4 and release second claw half 110 to contact mobile device 130, thereby securing mobile device 130 into holder 100.

To close and stow holder 100, the user again pulls second claw half 110 away from trim 122 and first claw half 108, removes mobile device 130, and releases second claw half 110, which retracts towards first claw half 108 to place holder 100 again in the position depicted in FIG. 2. The user once again pushes against cover 124 towards A-pillar 120 until holder 100 relatches within cavity 128, placing holder 100 into its stowed configuration depicted in FIG. 1.

As can be seen in FIGS. 1-4 and 6A-C, housing 102 is configured to substantially enclose claw 104 when claw 104 is in a stored position, as most clearly depicted in FIG. 6A. In the preferred embodiment, housing 102 is shaped similar to a tray or a bowl so as to contain the various components of claw 104 and latch 116. The primary purpose of housing 102 is to secure to A-pillar 120, thereby securing holder 100 to the vehicle. Thus, housing 102 can be shaped in any fashion that will allow claw 104 to be hingedly secured to A-pillar 120, regardless of whether it physically encloses claw 104 and related constituent components. In some embodiments, housing 102 could simply be a mounting plate configured to secure to A-pillar 120 that does not otherwise enclose claw 104. Housing 102 can be manufactured from any suitable material, such as metal, plastic, composites, wood or any other similar material now known or later developed. Housing 102 is preferably equipped with a way to secure housing 102 to A-pillar 120, such as holes for receiving bolts, screws, snaps, clips, or any other suitable fastener types. In other embodiments, housing 102 can be welded, soldered, brazed or otherwise permanently attached to A-pillar 102. In still other embodiments, housing 102 may not be a separate component of holder 100, but rather an integral part of A-pillar 102.

Figure 5:
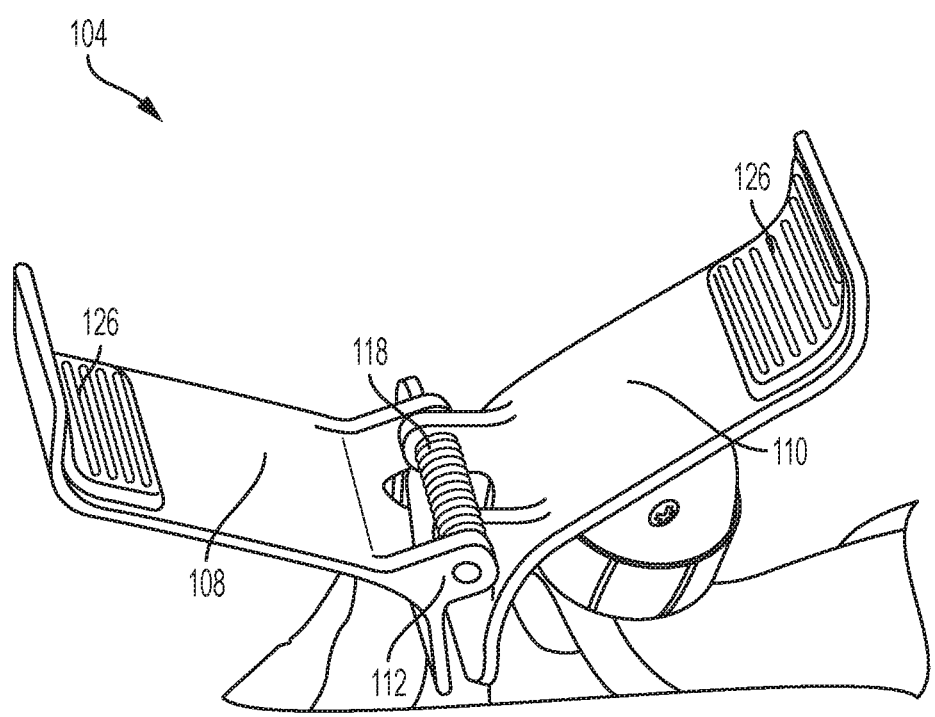
FIG. 5 is a perspective view of the claw mechanism of the holder shown in FIG. 1.

In the example shown in FIGS. 5-6C, the constituent components of claw 104 are depicted. Claw 104 serves to hold mobile device 130 securely while holder 100 is in use. Claw 104 is comprised of a first claw half 108 and a second claw half 110. These two halves are hingeably connected by hinge 112, and a claw spring 118 is supplied to provide a force to bias second claw half 110 towards first claw half 108, thereby urging claw 104 towards a closed position. A user must pull second claw half 110 away from first claw half 108 to insert mobile device 130 into claw 104, whereupon mobile device 130 is held securely in claw 104 by action of claw spring 118. First and second claw halves 108 and 110 can be fabricated from materials such as plastic, metal, composites, wood, or any other similarly suitable material now known or later developed.

Claw 104 could also be implemented as a mechanism that allows second claw half 110 to translate, rather than hinge, away from first claw half 108. In such an implementation, second claw half 110 would slide laterally relative to first claw half 108, and claw spring 118 would provide a bias causing second claw half 110 to translate laterally towards first claw half 108. Such a mechanism could be implemented by a plurality of tracks or pins coupled to each of first claw half 108 and second claw half 110 that locks the two halves together to only allow lateral movement. However, the reader should understand that this is one possible implementation only, and any other implementation that allows for lateral translation, in addition to hinging, between first claw half 108 and second claw half 110 is still within the disclosed invention.

As seen in FIGS. 6A-6C, claw 104 itself is hingeably affixed to housing 102 by hinge 106. Housing 102 and first claw half 108 are each equipped with portions of a latch 116, which acts to releasably secure claw 104 to and within housing 102 when holder 100 is not in use. Latch 116 is preferably implemented as a push-push latch mechanism, where a user pushes upon claw 104 in a direction towards housing 102, which causes latch 116 to either secure or release claw 104 from housing 102, depending upon whether claw 104 is in a released or secured configuration, respectively. Also shown is a latch spring 114, which is configured to bias claw 104 away from housing 102. When claw 104 is released, latch spring 114 urges claw 104 away from housing 102 so that a user can grasp second claw half 110 and open it to insert a mobile device 130. FIG. 2 depicts holder 100 in this configuration, with claw 104 pushed away from A-pillar 120. Conversely, when claw 104 is secured by latch 116, latch spring 114 provides a counter pressure against latch 116, which, when latch 116 is implemented using preferred push-push mechanism, is necessary for latch 116 to operate effectively. FIG. 1 depicts holder 100 in a closed and latched configuration.

Latch 116 is implemented as a push-push mechanism in the preferred embodiment. Such a latch includes a pin on the portion to be secured that fits into a receiver on the securing substrate, and operates by toggling between a secured and released configuration by successive pushes into the latch. In holder 100, latch 116 is configured so that pushing claw 104 in the direction of A-pillar 120, so that claw 104 is displaced below the surface of trim 122, will cause claw 104 to be released from housing 102 if secured, and secured if released. It should be understood that latch 116 need not be implemented only as a push-push mechanism, but can be implemented using any suitable mechanism for releasably securing claw 104 into housing 102. For example, some embodiments could use a magnetic catch, or a spring loaded or cammed pivot where a user can either push one side of cover 124 or pull to overcome a fulcrum, which either keeps claw 104 within housing 102 or biases it out of housing 102. Further, it will be appreciated that, depending upon the mechanism used to implement latch 116, latch spring 114 may be unnecessary, or may possibly be configured to bias claw 104 towards housing 102.

Further, hinge 106, and possibly latch 116 and latch spring 114 if required, can be implemented using a mechanism that translates, rather than rotates, outward when latch 116 is released. In one possible configuration, claw 104, rather than being hinged by hinge 106 to housing 102, is mounted on a plurality of close-ended tracks that allow it to translate within the tracks. Pushing upon cover 124 against latch spring 114 will result in latch 116 releasing, and latch spring 114 pushing claw 104 to cause it to slide within the plurality of tracks to laterally translate cover 124 away from the surface of trim 122. It should be understood that this is one possible implementation, and other mechanisms that allow for lateral translation rather than hinging could be implemented without departing from the disclosed invention.

Although FIGS. 6A-6C depict latch spring 114 and claw spring 118 as being located separate from hinges 106 and 112, it will be appreciated by a person skilled in the relevant art that latch spring 114 and claw spring 118 could be integrated into hinges 106 and 112, respectively, or located at any other position that would enable each spring to provide a sufficient bias force as described in the foregoing. Latch spring 114 could alternatively be integrated into latch 116. Latch spring 114 and claw spring 118 can be implemented using any type of spring or similarly functioning mechanism now known or later developed that can fit into the package space required for holder 100 while providing the foregoing functionality. FIG. 5 depicts one such alternative implementation of claw spring 118, where claw spring 118 is in a coiled configuration that is integral to hinge 112. A similar configuration could be used for hinge 106 and latch spring 114.

Referring to FIG. 5, support mats 126 are depicted upon the ends of first claw half 108 and second claw half 110 that are configured to receive mobile device 130. Support mats 126 are preferably rubber or a similar type of non-slip plastic that is both sufficiently pliable so as to be non-marring to an inserted mobile device 130, as well as having a sufficiently high coefficient of friction so as to prevent mobile device 130 from moving or otherwise being dislocated by the expected movements of a vehicle into which holder 100 is mounted when mobile device 130 is held in place by the force of claw spring 118. Such materials may include rubber, neoprene, silicone, or another similarly suitable material now known or later developed. Support mats 126 may be implemented using separate components that are mechanically attached to the ends of first claw half 108 and second claw half 110, may be overmolded during the fabrication of first claw half 108 and second claw half 110, or any other suitable attachment method now known or later developed.

FIG. 5 also depicts the ends of first claw half 108 and second claw half 110 as having a slight bend towards the interior of claw 104, thus configuring first claw half 108 and second claw half 110 to more positively retain mobile device 130. This is necessary as claw spring 118 in conjunction with first claw half 108 and second claw half 110 would cause mobile device 130 to experience a lateral force urging mobile device 130 away from claw 104 in the absence of either a bend or other feature to counter this lateral force. The depicted slight bend is only one possible embodiment; FIGS. 6A-6C schematically depict support mats 126 as being shaped with a notch so as to provide a positive retention of mobile device 130. A person skilled in the relevant art will appreciate that the ends of first claw half 108, second claw half 110, as well as support mats 126 all can be shaped in any fashion so long as the cooperation of all features act to positively retain mobile device 130. Moreover, in some other embodiments, support mats 126 may be omitted entirely, depending upon the type of materials used to fabricate first claw half 108 and second claw half 110.

FIGS. 6A to 6C also depict the position of A-pillar trim 122, a cover 124, and their positions with respect to A-pillar 120. A space or a cavity 128 is formed by an A-pillar sheet metal. Holder 100 is attached to the sheet metal of the A-pillar 120. Holder 100 may be a standalone device mounted to the A-pillar sheet metal or integrated with the A-pillar 120. An A-pillar trim 122 may be assembled to the A-pillar after holder 100 is mounted to the A-pillar sheet metal. The cover 124 may have a particular appearance that preferably complements the vehicle-pillar trim, such as a particular color and texture.

Upon second claw half 110 is disposed cover 124, which is configured to match the appearance of trim 122, such as having substantially identical color and texture. In one embodiment, cover 124 is implemented as a separate piece that is attached to the side of second claw half 110. In this embodiment, cover 124 is essentially a second trim piece, and can have similar characteristics as trim 122. Alternatively, cover 124 can be integral with second claw half 110, viz. it can comprise the interior-facing surface of second claw half 110, which is treated so as to substantially match the appearance of trim 122. Cover 124 is preferably sized to closely match the opening of cavity 128, to obtain as seamless an appearance as possible when holder 100 is in a stored and latched configuration.

Although the vehicle contemplated in the foregoing is typically an automobile, the reader should understand that the vehicle could be any conveyance, with holder 100 capable of being implemented in cars, trucks, boats, aircraft, or any other suitable conveyance.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A holder for a portable electronic device, comprising:
    a housing configured to be attached to an A-pillar of a vehicle; and
    a claw hingedly attached to the housing and comprised of:
        a first claw half,
        a second claw half hingedly attached to the first claw half, and
        a spring to bias the second claw half towards the first claw half;
    wherein at least the second claw half is extended from a surface of the A-pillar to hold the electronic device when the electronic device is in use, and the claw is selectably retained within the housing when the holder is not in use.

2. The holder of claim 1, further comprising a push-push latch to enable a release, wherein the claw is selectably retained within the housing by the push-push latch, so that an application of force by a user releases the claw to be away from the surface of the A-pillar and the user is able to pull at least the second claw half from the housing and place the electronic device between the first claw half and the second claw half.

3. The holder of claim 2, further comprising a second spring to bias the claw away from the housing when the housing is disengaged from the push-push latch.

4. The holder of claim 1, wherein each of the first claw half and second claw half further comprise a support mat.

5. The holder of claim 1, wherein the second claw half includes a cover configured to substantially match an A-pillar trim in color and material.

6. The holder of claim 5, wherein the housing is configured to fit into a cavity in the A-pillar so that the cover of the second claw half is approximately flush with the A-pillar trim.

7. The holder of claim 1, wherein the first claw half is configured to be rotatable with respect to the second claw half.

8. The holder of claim 1, wherein the housing substantially encloses the claw.

9. A pillar mounted holder for a portable electronic device, comprising:
    a housing secured to the pillar;
    a claw hingedly attached to and substantially enclosed by the housing, and comprised of a first claw half, a second claw half hingedly attached to the first claw half, and a spring configured to bias the second claw half towards the first claw half; and
    a latch mechanism configured to selectably retain the claw within the housing,
    wherein the holder is mounted to the pillar.

10. The holder of claim 9, wherein the pillar is an A-pillar of a vehicle.

11. The holder of claim 10, wherein the holder is configured to be secured to a sheet metal piece of the A-pillar, and wherein an outer surface of the second claw half is substantially flush with a surrounding surface of the A-pillar when the holder is not in use.

12. The holder of claim 11, wherein the latch mechanism further comprises a push-push latch and a second spring configured to bias the holder away from the pillar.

13. The holder of claim 9, wherein the first claw half and second flaw half each further include a support mat configured to securely hold the portable electronic device without damage.

14. A vehicle configured to receive a portable device, comprising:
    an A-pillar; and
    a holder, including:
        a housing,
        a first claw half hingeably secured to the housing,
        a first spring configured to bias the first claw half away from the housing,
        a second claw half hingeably secured to the first claw half,
        a second spring configured to bias the second claw half towards the first claw half, and
        a latch mechanism configured to selectively retain the first claw half and second claw half substantially within the housing;
    wherein:
        the housing of the holder is attached to a sheet metal piece of the A-pillar, and
        the second claw half is held within the housing and a cover of the second claw half is disposed substantially flush with a surface of an A-pillar trim facing the vehicle interior when the latch mechanism retains the first claw half and second claw half within the housing.

15. The vehicle of claim 14, wherein at least the second claw half is positioned outside of the housing by the first spring when the latch mechanism releases the first claw half.

16. The vehicle of claim 15, wherein the latch mechanism comprises a push-push latch that is configured to release at least the second claw half when a force is applied to the surface of the second claw half.

17. The vehicle of claim 16, wherein the first claw half and second claw half cooperate to retain the portable device.

18. The vehicle of claim 17, wherein the first claw half and second claw half each further comprise a support mat configured to retain the portable device without causing damage to the portable device.

19. The vehicle of claim 18, wherein the cover of the second claw half is configured to match an appearance of the A-pillar trim.

20. The vehicle of claim 18, wherein the cover of the second claw half is made from the same material as the A-pillar trim.

* * * * *